April 28, 1970 M. J. DE GOOD ET AL 3,508,640

ARTICLE ORIENTING CONVEYOR

Filed Nov. 3, 1967 3 Sheets-Sheet 1

INVENTORS
MAYNARD J. DE GOOD
CLYDE L. BOWMAN
BY
*Price, Heneveld,*
*Huizenga & Cooper*
ATTORNEYS

INVENTORS
MAYNARD J. DE GOOD
CLYDE L. BOWMAN

BY

ATTORNEYS

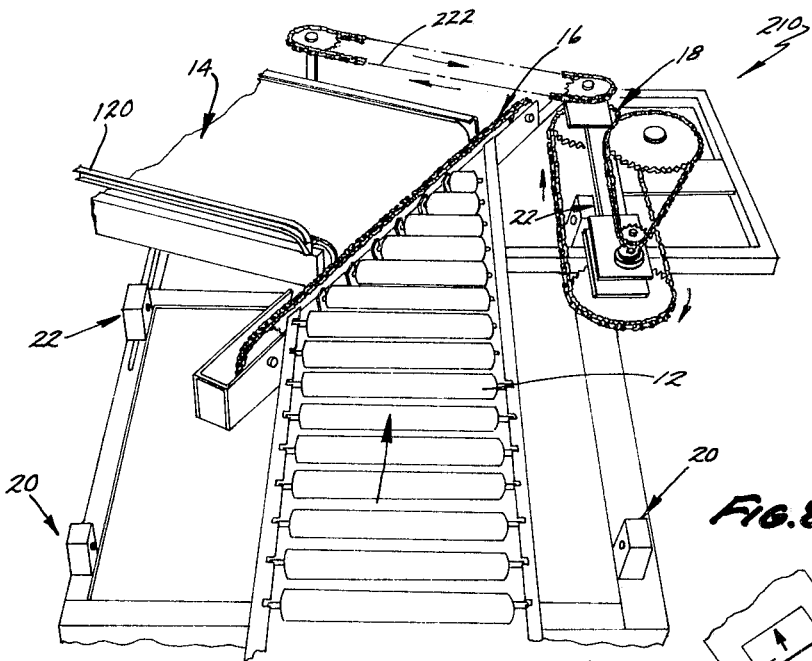
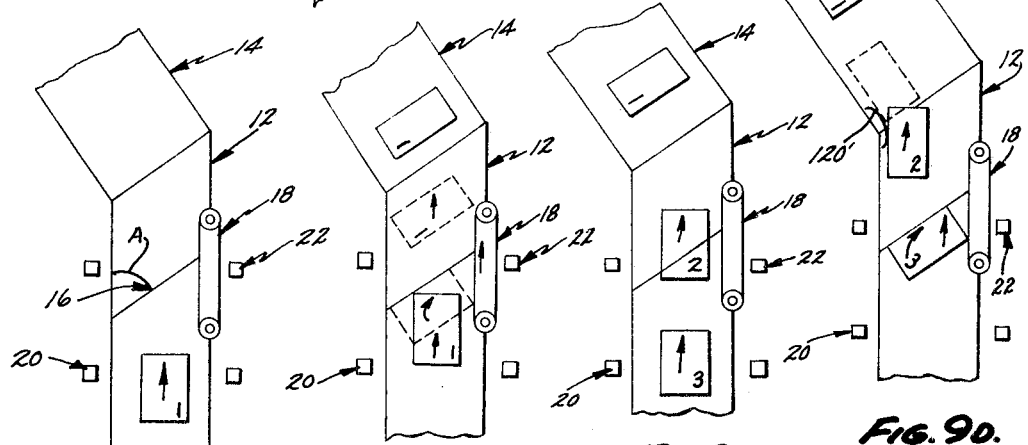

United States Patent Office 3,508,640
Patented Apr. 28, 1970

3,508,640
ARTICLE ORIENTING CONVEYOR
Maynard J. De Good and Clyde L. Bowman, Grand Rapids, Mich., assignors to Rapistan Incorporated, Grand Rapids, Mich., a corporation of Michigan
Filed Nov. 3, 1967, Ser. No. 680,391
Int. Cl. B65g 47/24
U.S. Cl. 198—33           21 Claims

ABSTRACT OF THE DISCLOSURE

Carton orienting means and method capable of turning selected cartons aligned with a first conveyor, through successive complementary acute angles for carton re-alignment on a second conveyor, as for entry into a palletizer, employing activatable powered diagonal turning and alignment means oriented at a first acute, assisted by edge restraining means to rapidly and controllably turn advancing cartons through a first acute angle, coupled with the second conveyor being at a complementeary acute angle to accept the cartons in re-aligned fashion, the diagonal turning and alignment means being controllably shifted between activated and non-activated conditions by carton detecting means for selection of cartons and controlled amounts of turning, and the second conveyor having higher friction than the first for controlled turning of non-selected cartons through the complementary acute angle in an angular direction opposite the turning direction of selected cartons by the diagonal turning means.

BACKGROUND

This invention relates to conveyors, and more specifically to high speed carton or article orienting conveyor apparatus.

Techniques for re-orienting cartons, although having significance in the conveyor art for many years, have become particularly important in recent years due to the rapidly advancing state of the palletizer art. As is known, effective layer forming of cartons on pallets requires interlocking of the layers of cartons. If the cartons are elongated in one direction, interlocking can be readily achieved by orienting some cartons with their elongated dimension normal to that of other cartons in that layer to form a pattern, varying this pattern in the next layer, and so forth. To do this, selected ones of cartons advancing in like orientation along a feed conveyor to the palletizer, are rotated 90° prior to feeding them onto the palletizer layer former. Because the diagonal dimensions of the cartons are greater than the width and length dimensions, rotation of the cartons into the re-oriented position normally requires substantial space between cartons. This limits feeding rates. Also, since the amount of rotation must usually be 90°, this normally requires a considerable time factor. Due to these and related factors, the step of re-orientation of selected cartons can constitute a definite handling rate limitation on the palletizing systems, or on some other system requiring re-orientation of cartons or like articles.

In this regard, since the equipment disclosed herein is intended to be used largely with "cartons", this term will be used in the description thereof for convenience. However, since it is entirely possible that the orienting equipment disclosed could be used with other types of articles, the descriptive term carton is not intended to form any sort of limitation on the novel equipment and method claimed.

Another difficulty associated with carton orienting equipment is the resulting wide variation of the angle of turning of cartons of varying weights. That is, a heavy carton will tend to be rotated smaller angular amounts than that desired, while a lighter carton will tend to be rotated greater angular amounts than that desired. As a result, most present equipment can operate dependably only on constant weight cartons for which it has been regulated.

SUMMARY OF THE INVENTION

It is an object of this invention to provide a relatively simple, highly dependable apparatus for selectively re-orienting conveyed cartons at a rapid rate. Another object of this invention is to provide carton orienting apparatus capable of controllably and dependably re-orienting a sequence of cartons of varying weight through the same angle, to do so at rapid rates at for example, about 60 per minute, and enabling the cartons to be relatively close together.

Another object is to provide a simple driven diagonal mechanical carton engager in combination with a pair of specifically arranged conveyor sections to dependably re-orient selected cartons in a sequence.

Another object of this invention is to provide mechanical carton re-orienting apparatus responsible to adjustably positioned carton detectors for actuation and de-activation thereof, to turn selected ones of a series of cartons through a controlled acute angle while cartons are advancing, and to feed such turned cartons onto a conveyor surface at a complementary acute angle thereto for high speed turning of selected cartons in one rotational direction. The conveyors are also correlated to cause non-selected cartons in the sequence to be rotated in the opposite direction through the complementary acute angle so that the selected and non-selected cartons on the second conveyor are at right angles to each other.

Basically, the preferred form of the invention includes powered carton engageable driving means oriented and advancing at a specific acute angle across a first carton conveyor, shiftable between an active carton engaging, turning, and aligning position and an inactive position, in response to a sequence of carton detecting means. This cooperatives with carton restraining means along the edge of the first conveyor powered to prevent over-turning tendencies of the cartons. Combined with these is a second conveyor downstream of said driving means, arranged at an acute angle which is complementary to said acute angle of said driving means to properly receive the partially rotated selected cartons. The second conveyor also has a higher friction surface than that of the first conveyor to cooperate with a carton turning abutment and rotate non-selected cartons through the complementary acute angle but in the opposite angular direction to said one angular direction to align non-selected cartons on the second conveyor at a 90° angle to selected cartons.

These and other features and objects of the invention will become apparent upon studying the following specification in conjunction with the drawings in which:

FIG. 8 is a perspective view of a modified form of the novel apparatus operating on the same basic principles;

FIG. 9a is a schematic plan view showing a first carton approaching the diagonal carton turning means on the first conveyor;

FIG. 9b is a schematic plan view of the system showing the turning action of the diagonal device and the transfer of the turned carton from the first conveyor to the specifically oriented second conveyor of the system;

FIG. 9c is a schematic plan view of the apparatus in FIGS. 9a and 9b, showing the first turned carton being transferred to the second conveyor, and the second carton being allowed to pass the diagonal turning device without being acted upon by it; and FIG. 9d is a schematic plan view of the system in FIGS. 9a, 9b and 9c, showing the second previously unturned carton being turned through an acute angle upon being transferred from the first to the second conveyor, and the third carton being turned by diagonal turning means as it progresses along the first conveyor.

DESCRIPTION OF THE PREFERRED EMBODIMENTS

Figure 1:
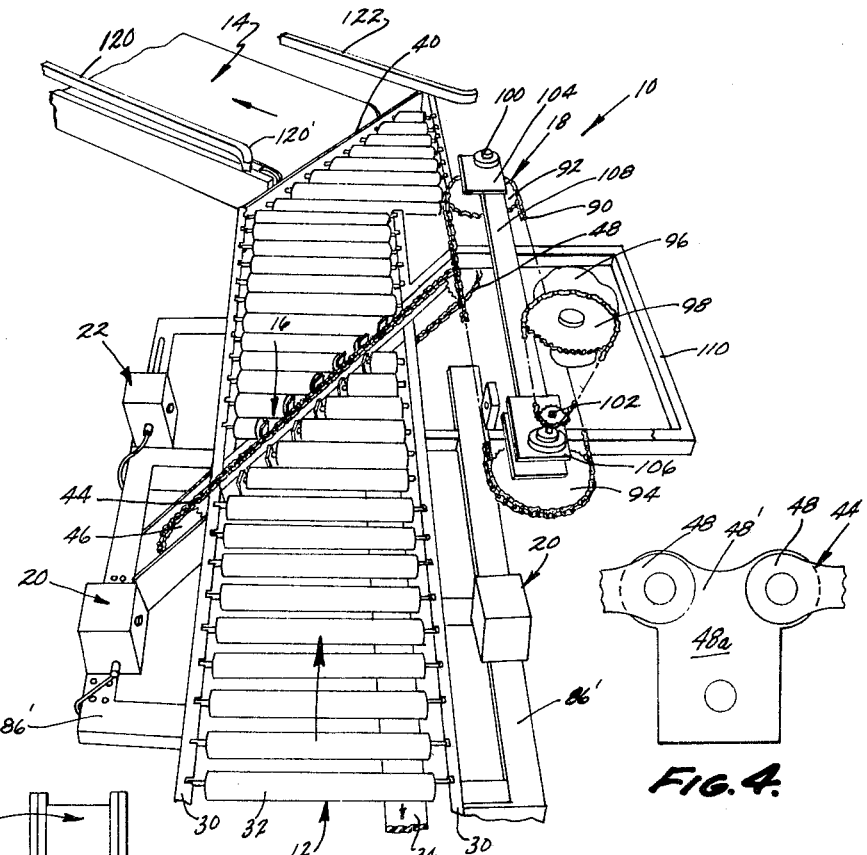
FIG. 1 is a perspective view of the novel apparatus.

Referring now specifically to the drawings, the complete combination 10 illustrated in FIG. 1 basically includes a first conveyor sub-assembly 12, a second conveyor sub-assembly 14, a carton turning means 16 oriented diagonally across the first conveyor path, carton restraining means 18 cooperative with with sub-assembly 16, and located alongside the edge of the first conveyor, carton detecting means 20 to activate the diagonal turning means 16, and carton detecting means 22 to deactivate the carton turning means.

The first conveyor sub-assembly 12 includes a structure which allows cartons or like articles to turn on its conveyor surface without undue amounts of friction. Hence, it preferably constitutes a conveyor having rotatable elements such as rollers. This conveyor includes a pair of side rails 30 between which rotatable rollers 32 are mounted in generally parallel fashion, these rollers being of equal length except for the decreasing length rollers immediately adjacent the diagonally positioned sub-assembly 16. These rollers may form part of a gravity type conveyor, or alternatively a powered conveyor as with an underlying reversely operated drive belt 34 or the equivalent. The conveyor surface formed leads to a vertically shiftable carton turning sub-assembly 16. Also, in the first form of the invention assembled, and in the structure as illustrated in FIG. 1, the first conveyor 12 extends beyond this diagonal sub-assembly 16 until it joins with the second conveyor on a diagonal junction 40 which is substantially parallel to sub-assembly 16. However, it has been determined that the section of the conveyor between sub-assembly 16 and the second conveyor 14 is not necessary so that the second conveyor can be mounted immediately adjacent the sub-assembly 16 as illustrated in the modified apparatus in FIG. 8.

Figure 4:
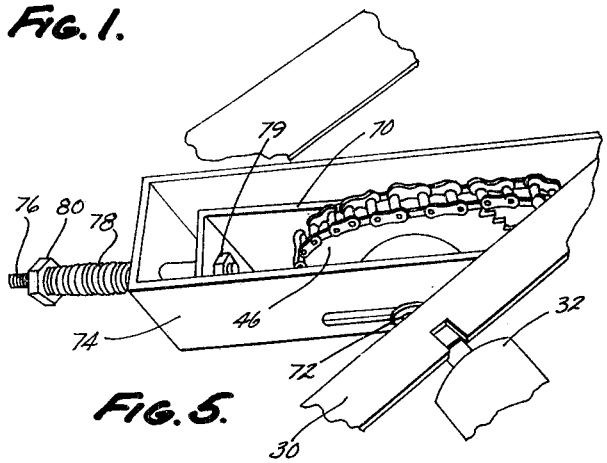
FIG. 4 is an enlarged side elevational view of a segment of the chain forming part of the diagonal carton turning means.
Figure 3:
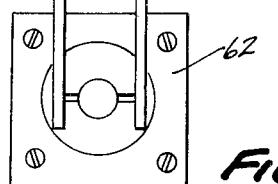
FIG. 3 is an enlarged sectional view of the diagonally oriented carton turning means.
Figure 6:
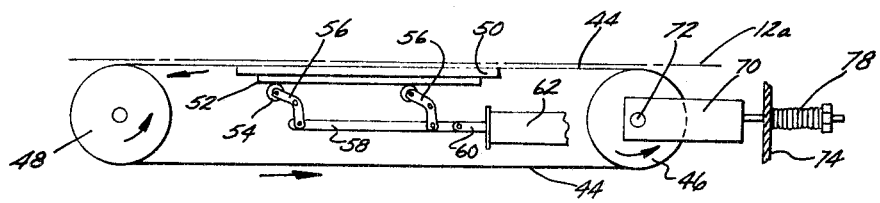
FIG. 6 is a schematic side elevational view of the diagonal carton turning means in its lowered position.
Figure 7:
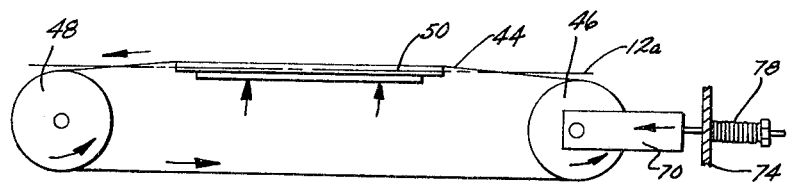
FIG. 7 is a schematic elevational view of the apparatus in FIG. 6, in its elevated carton turning position.

Sub-assembly 16 includes an elongated circuitous recirculating driven member 44 which preferably constitutes a roller chain that circulates around a pair of sprockets 46 and 48 mounted on opposite sides of first conveyor 12. Roller chain 44 conventional links 48 (FIG. 4) pivotally linked together, and a special type of link 48' between the conventional links 48. The special links include a depending pair of spaced flanges 48a (FIG. 3 and FIG. 4) which straddle a guide rail 50 such as a metal bar having a hardened surface. The upper pass of roller chain 44 therefore is guided by member 50, while the lower pass is suspended freely as illustrated schematically in FIG. 6. When the turning means is inactive, the upper pass of this roller chain is allowed to travel just beneath the plane of conveyor surface 12a (FIG. 6) of first conveyor 12. Hence, the roller chain is out of the path of cartons or other like articles moving along the conveyor, to not interfere with them. However, the upper pass of roller chain 44 can be elevated into the path of cartons on conveyor path 12a, with vertical upward shifting of support guide rail 50 as illustrated in FIG. 7. This can be achieved by elevating support member 50 with elevation of an underlying optional support bar 52 against the underside of which a pair of rollers 54 bear. These rollers are rotationally mounted on a pair of brackets 56 (FIG. 6) which are pivotally fixed at their centers, and are generally L-shaped. The opposite ends of these brackets 56 are pivotally connected to an extended portion 58 of cylinder rod 60 of a fluid cylinder 62. Thus, extension of cylinder 62 causes pivoting of brackets 56 to vertically elevate rollers 54 and thus shift guide rail 50 upwardly with roller chain 44 into the path of cartons passing along conveyor 12. The diagonal driven chain thereby moves between an inactive lowered position out of the path of cartons and an active raised position in the carton path where it can engage and turn cartons in a manner to be described in detail hereinafter.

Figure 5:
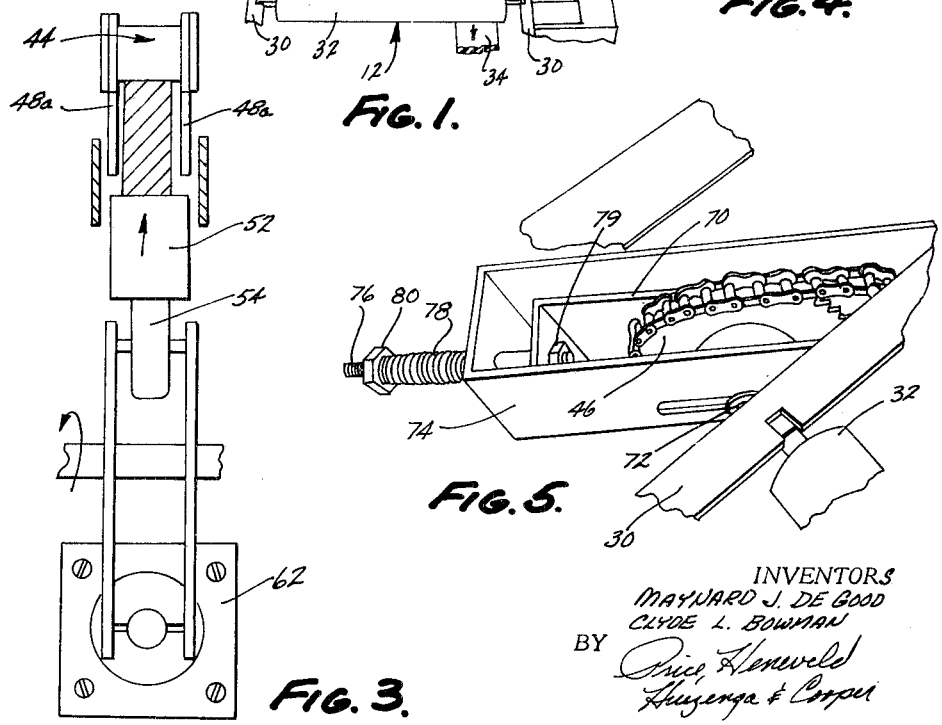
FIG. 5 is an enlarged sectional perspective view of one end portion of the driving assembly for the diagonal carton turning means.

The most dependable operation of this apparatus occurs with chain 44 being under constant tension. To achieve this constant chain tension regardless of the vertical position of guide rail 50, a special spring take-up (FIGS. 5-7) is used. That is, while sprocket 48 is rotationally mounted on a fixed pivot rotational axis, sprocket 46 is floatingly mounted in a U-shaped bracket 70 using an axle 72 that extends through slots in fixed bracket 74. Bracket 70 is mounted on a rod 76 that extends through fixed bracket 74. It is threaded on its ends to receive nuts 79 and 80. A compression coil spring 78 extends between the end face of fixed bracket 74 and nut 80. Thus, this compression spring applies a constant tension bias to the chain assembly, but allows chain movement against this bias for unhindered elevation of the upper pass of roller chain 44 (as in FIG. 7) by compression of spring 78.

Figure 2:
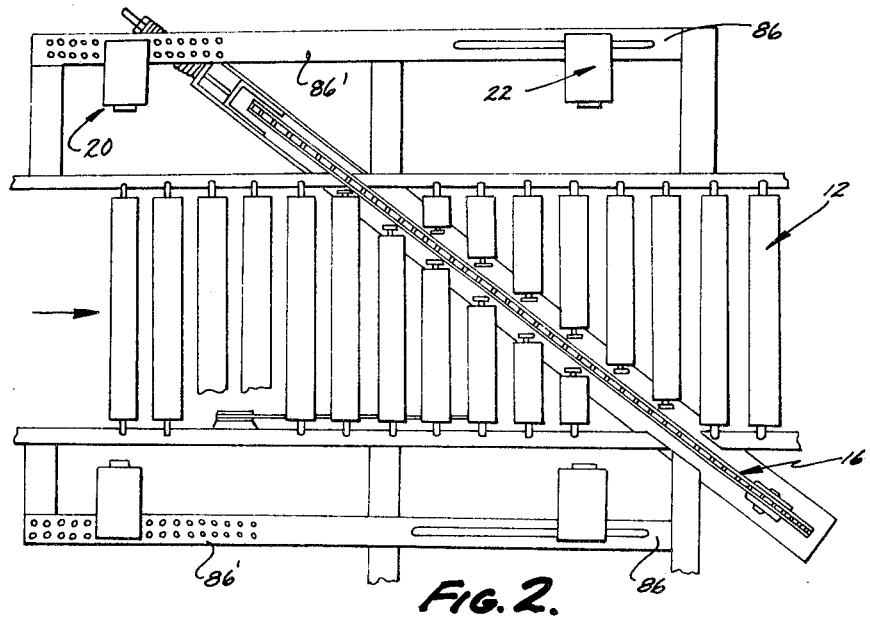
FIG. 2 is a partial plan view of the apparatus in FIG. 1.

Subassembly 16 is shifted from its inactive to its active position in response to a signal from the first carton detecting means 20. This carton detecting means may, for example, be a suitable photoelectric detector of conventional type which emits an electrical signal to indirectly actuate cylinder 62. This could be done by conventional means such as an amplifier to amplify the electrical signal, the amplified signal then operating an electrical solenoid operated fluid valve to allow fluid flow to cylinder 62 in a controlled fashion to extend the cylinder. This then elevates diagonal carton turning means 16. The turning means should be lowered again at an appropriate time for accurate alignment of the carton at the specific acute angle without hindering its further movement, in a manner to be explained hereinafter, in response to a signal from a second carton detecting means 22. This likewise can be a suitable photoelectric detector to be operably associated with fluid cylinder 62 for lowering sub-assembly 16 at a appropriate time. A specific location of the detector means 22 can be varied, as for example, by mounting them adjustably along slotted supports 86 (FIG. 2). This adjustment enables cartons of different lengths to be accommodated, as will be explained.

Likewise, the first carton sensing means 20 may be adjustably positioned along the conveyor to locate it exactly with respect to sub-assembly 16, by using a plurality of spaced mounting orifices in support section 86'. (It will be noted that in FIG. 2, the carton restraining sub-assembly 18 is not shown in order that the carton detecting sub-assemblies 20 and 22 may be more readily seen.)

Carton restraining sub-assembly 18 has a significant and important role in the novel combination. Since diagonal, carton turning sub-assembly 16 has a powered means which moves at a high rate of speed diagonally across the conveyor, the tendency would be to divert the carton from the conveyor after the carton has been turned. Such undesired diversion or discharging of the carton from the conveyor is prevented by sub-assembly 18. This sub-assembly includes a recirculating continuous flexible drive means such as a roller chain 90 or a suitable belt or the like, which revolves around sprockets 92 and 94 mounted alongside and in alignment with first conveyor 12. The inner pass of chain 90 that is immediately adjacent conveyor 12 normally moves at the same rate of speed as the conveyor. It is driven from a suitable drive motor assembly 96 through a power sprocket 98 to the shaft of sprocket 94. The shafts of sprockets 92 and 94, 100 and 102 may be mounted in suitable supports 104 and 106 connected by a brace 108 and suitably secured to the framework of conveyor 12 by a bracket mechanism 110. This sub-assembly, by being powered, also helps prevent the cartons from rotating too much as tends to occur with abutment of the carton corner with a fixed guard rail.

Whether the supplemental conveyor section between sub-assembly 16 and the second conveyor 14 is used as in FIG. 1 or is not used as in FIG. 2, the terminal portion of the first conveyor is diagonal, parallel with sub-assembly 16. It has been found that this angle with respect to the axis of the conveyor path should be between 30° and 50°, with 37½° to 45° being preferred. The lead-in edge or portion of second conveyor 14 is also at this same angle with respect to the main axis of first conveyor 12. In other words, the direction or axis of the conveyor path of second conveyor 14 forms an acute angle with respect to conveyor 12 which is complementary to the acute angle of sub-assembly 16 with respect to the axis of conveyor 12, i.e. the two angles add up to 90°. It will also be noted that the second conveyor is oriented in the opposite lateral direction from the first conveyor than the direction of orientation of sub-assembly 16.

Preferably, second conveyor 14 comprises a rubber belt or some other suitable conveyor surface forming means that has a higher frictional characteristic than the first conveyor 12. The purpose of this is to cause cartons which are not turned by sub-assembly 16 to be turned around an abutment, such as the edge of guard rail 120 during transfer of these particular cartons between the conveyors. Since they have not been previously turned by sub-assembly 16, they are still aligned with the first conveyor as they approach the second conveyor. The high friction surface rotates them as it pulls them around the abutment onto the scond conveyor. Instead of the leading edge abutment 120' of guard rail 120, a turning post or other equivalent means could be used. On the opposite side of the second conveyor is a second guard rail 122 which in FIG. 1 is illustrated merely as a bar, and in FIG. 8 is illustrated in its preferred form of a powered guard rail 222 which may be driven by the mechanism for restraining sub-assembly 18.

OPERATION

The operation of the novel apparatus is preferably controlled by a memory type system which activates the first carton sensing means 20 only when certain cartons are passing, so that only selected ones of a series of cartons will be turned by sub-assembly 16. This is because the turning mechanism will normally be used in combination with and as a feed mechanism for a carton palletizing mechanism (not shown). However, it conceivably could be used for other applications. As explained in the introduction hereto, when palletizing cartons, it is different interfitting patterns in each successive layer so as to cause the carton to lock themselves in the multi-layer form.

Thus, for example, if a series of many cartons were to be advanced along the system, three of the cartons could probably be successively operated on in the manner illustrated as an example in FIGS. 9a through 9d. (Actually, these cartons are shown spaced a great deal further apart than necessary or normal, purely for illustrative purposes.) Carton detecting means 20 could be controlled by the memory system to be put into an activatable condition for carton 1, into a non-activatable position for carton 2, and again into an activatable position for carton 3. Thus, as carton 1 moves along conveyor 12 (FIG. 9a), detecting means 20 senses the carton prior to the carton reaching sub-assembly 16. Since detecting means 20 is activatable, sensing of the carton causes an electrical signal to indirectly activate cylinder 62 and elevate the upper pass of constantly driven roller chain 44. Thus, carton 1 strikes the roller chain on the carton front left corner as illustrated. Since the carton is advancing along the conveyor, and since the drive means 16 is moving at a rapid rate faster than the conveyor speed diagonally of the conveyor, chain 44 of sub-assembly 16 causes the carton to be turned in a clockwise direction until the left face of the carton strikes against the elongated chain to be re-oriented diagonally of conveyor 12 at the specific acute angle of the diagonal sub-assembly 16. In the next fraction of a second, the carton is advanced slightly diagonally across the conveyor until its right front corner strikes sub-assembly 18 to restrain the carton from moving further in a lateral direction on conveyor 12 (FIG. 9b). Just prior to the carton becoming completely aligned with chain 44 and striking roller chain 90 of sub-assembly 18, it is detected by means 22. The reason that means 22 is located so that it detects the carton a specific but small time interval prior to the carton being completely aligned with means 16 is to allow the necessary time delay to take place for the electrical means to activate the fluid cylinder which in turn lowers the mechanical sub-assembly 16. Thus, just as the carton becomes aligned with sub-assembly 16, roller chain 44 drops to its inactive position to allow the carton to continue its advancement along the conveyor. Hence, there is basically no stoppage of the carton as it advances. Rather, the operation is continuous and rapid as the carton moves, enabling individual cartons to follow closely upon each other. Further, since the carton rotates as it advances, it does not swing into the path of the following carton.

Since different length cartons tend to be completely re-oriented through the acute angle at slightly different rates, the sensors can be slightly adjusted longitudinally along the first conveyor to accommodate each length. No adjustment need be made for different weight cartons.

As carton 1 advances along the conveyor in its diagonal orientation, where it is not aligned any longer with conveyor 12, it meets the diagonal juncture of conveyors 12 and conveyor 14. Since the sub-assembly 16 is at the same angle with respect to the axis of the first conveyor as the junction line of the second conveyor, the carton being transferred to the second conveyor is automatically in alignment with the second conveyor as illustrated schematically in FIG. 9 in phantom. Hence, its width or breadth axis and its lateral faces will be aligned with the sides of conveyor 14. When number 2 package approaches the zone of the detecting and turning means, carton detecting means 20 (FIG. 9c) is in an inactivatable condition, so that the passage of carton 2 between the photoelectric sensors does not activate sub-assembly 16. The carton thus continues to pass along conveyor 12 uninterrupted. It maintains its alignment with conveyor 12 until it reaches the junction of conveyors 12 and 14. At this time, since the greater frictional relationship of conveyor 14 dominates, the package is pulled around a corner junction abutment, e.g. the abutment 120' to change positions as illustrated in FIG. 9d so that its axes and faces become aligned with second conveyor 14. It therefore is turned through an acute angle which is in effect a complement to the acute angle of the diagonal turning means 16, and in the counterclockwise direction, i.e. turned in the opposite direction that carton 1 was turned. Therefore, although neither carton was rotated 90°, since each was rotated in opposite directions through complementary acute angles, they are now rotated 90° with respect to each other, and both aligned with the second conveyor as they proceed.

As carton number 3 approaches the diagonal diverting means, and specifically the carton detecting means 20 therefor, detecting means 20 is again activatable, to signal mechanism 16 to again rise and rotate carton 3 in a clockwise direction through the acute angle of the diagonal means 16 as with carton number 1. Carton number 3 will then proceed as did carton number 1 to be rotated 90° with respect to carton number 2 but in actuality to be only rotated through the small acute angle.

Because of these operational factors, the operation can occur in rapid fashion. In fact, it has been determined that 60 cartons per minute can be readily handled with this novel system, using an angle of 37½° between subassembly 16 and the axis of conveyor 12. If this angle is made slightly larger, e.g. 45°, the number of cartons which can be handled per minute becomes slightly less. Typical speeds of the assemblies include 280 feet per minute for conveyor 12, 280 feet per minute for subassembly 18, 400 feet per minute for chain 44 of subassembly 16, and 280 feet per minute for conveyor 14 (for proper spacing of the cartons as they approach the palletizer). Obviously these are optional and can be varied greatly to suit the particular circumstances. There is a relationship between the speed of conveyor 12, however, and that of sub-assembly 16. Specifically, the speed of sub-assembly 16 in its direction of travel is to the speed of conveyor 12 as the cosine of the angle A (FIG. 9A) between their directions of travel, i.e. as the leg of the angle (along the direction of conveyor 12) is to the hypotenuse of the angle (along the direction of apparatus 16). Conveyor 14 normally has a speed equal to that of conveyor 12.

Since there should dependably be a significant space between sequential cartons on conveyor 12, to completely remove the possibility of conflict between cartons as the leading one is turned 45° by unit 16, another conveyor 11 (FIG. 9A) of slower speed than conveyor 12 is normally placed upstream of conveyor 12. As the cartons exit from conveyor 11 onto conveyor 12, therefore, they are spaced or singulated with individual carton acceleration.

MODIFICATION

As indicated previously, it has been determined that the extra section of conveyor 12 that falls between sub-assembly 16 and conveyor 14 is not really necessary. Thus, as illustrated by the modified assembly 210 in FIG. 8, conveyor 14 can be positioned immediately adjacent subassembly 16 so that the diagonal terminal edge of conveyor 12 at sub-assembly 16 is also the junction of the lead-on edge of conveyor 14. Such an assembly operates in the same basic fashion as described with respect to FIG. 1. Once a carton is turned by sub-assembly 16, and this sub-assembly lowers to its inactive position, the carton is immediately transferred onto conveyor 12 to be aligned with the conveyor as it proceeds. Conveyor 12 thus includes the same basic components, has the same basic cooperative restraining means 18 alongside it, includes the carton detector means 20 and 22 adjustably mounted for the particular type of installation desired, but preferably with a power take off from this sub-assembly 18 to a powered guard rail 222.

It is conceivable that other details of the construction could be modified without departing from the concept presented. Hence, the invention is intended to be limited only by the scope of the appended claims and the reasonably equivalent structures and methods defined therein, rather than by the specifically described details used to illustrate the invention.

We claim:

1. Carton orienting apparatus comprising: means forming a first conveyor surface to convey cartons in a path with the carton axes respectively normal and parallel to the conveyor path; article turning means associated with said conveyor surface and shiftable between an inactive position and an active carton engaging position, said turning means comprising powered means shiftable into said path and powered to turn cartons through an acute angle to be diagonally oriented of said path; and means downstream of said article turning means, forming a second conveyor surface positioned to receive cartons from said first conveyor surface, said second conveyor surface having a carton receiving portion substantially parallel to said diagonal orientation, to receive cartons turned through said acute angle and advance them with their axes parallel and normal to said second path.

2. The apparatus in claim 1 wherein said turning means comprises powered means extending diagonally across said first conveyor path at said first mentioned acute angle thereto, shiftable between an active position in the path of cartons and in inactive position out of the path of carons, and said apparatus including carton restraining means along said first conveyor path adjacent said turning means to laterally restrain turning cartons from departing from said path.

3. The apparatus in claim 2 wherein said powered means comprises recirculating means driven diagonally at said first mentioned acute angle at a rate greater than the carton advancing rate along said first conveyor surface.

4. The apparatus in claim 3 wherein said carton restraining comprises a dynamic guard rail means driven in the downstream direction along said first conveyor path.

5. The apparatus in claim 4 wherein said dynamic guard rail means is powered recirculating means.

6. The apparatus in claim 1 including carton detecting means upstream of and operatively associated with said carton turning means to controllably detect a carton to be turned and shift said turning means to its active carton engaging and turning position.

7. The apparatus in claim 6 including second carton detecting means downstream of said first mentioned carton detecting means, adjacent to and operatively associated with the said carton turning means to detect a turning advancing carton and shift said turning means from its active position to its inactive position as the carton is completing its acute angle turn.

8. The apparatus in claim 2 wherein said first mentioned acute angle is between about 30° and 50°.

9. Carton orienting conveyor apparatus comprising: means forming a first conveyor surface having a first conveying path for conveying cartons aligned with said path; means forming a second conveyor surface downstream of said first conveyor surface, positioned to receive cartons from said first conveyor surface and advance them along a second conveyor path; carton turning means cooperative with said first conveyor surface, comprising driven means extending diagonally across said first conveyor path at a first acute angle thereto and driven at said acute angle, said carton turning means being shiftable into an active carton engaging and turning position to engage a corner of an advancing carton and turn it through said acute angle, with said driven means being supported to limit and set the angle of turn of the carton and shiftable to an inactive position allowing said carton to advance; carton restraining means alongside said first conveyor surface adjacent said diagonal turning means to prevent said turning means from discharging engaged cartons off the side of said first conveyor surface; and said second conveyor path being at an acute angle to said first conveyor path complementary to said acute angle of said turning means, with the lead-on portion of said second conveyor surface substantially parallel to said diagonal turning means, to cause turned cartons to be aligned with said second conveyor path.

10. The apparatus in claim 9 wherein said turning means, when in its inactive position, allows certain cartons to advance unturned, said apparatus including a turning abutment at the lead-in portion of said second conveyor surface, and said second conveyor surface having a higher friction surface than said first conveyor surface, to cause turning of said certain cartons through said complementary acute angle in the opposite direction of turning of the selected cartons and into alignment with said second conveyor path.

11. The apparatus in claim 9 wherein said carton restraining means comprises a dynamic guard rail means driven parallel to said first conveyor path to prevent turning of cartons through more than said first mentioned acute angle.

12. The apparatus in claim 9 wherein said turning means comprises recirculating means powered to rapidly turn a carton through said first mentioned acute angle while the carton is advancing.

13. The apparatus in claim 11 wherein said turning means comprises recirculating means powered to rapidly turn a carton through said first mentioned acute angle while the carton is advancing.

14. The apparatus in claim 11 wherein said dynamic guard rail means comprises powered recirculatory means.

15. The apparatus in claim 9 including carton detecting means upstream of and operatively associated with said carton turning means to controllably detect a carton to be turned and shift said turning means to its active carton engaging and turning position.

16. The apparatus in claim 15 including second carton detecting means downstream of said first mentioned carton detecting means, adjacent to and operatively associated with said carton turning means to detect a turning advancing carton and shift said turning means from its active position to its inactive position as said carton face engages said diagonal driven means.

17. The apparatus in claim 8 wherein the ratio between said greater rate of said recirculating means and said carton advancing rate along said first conveyor surface is approximately the cosine of said acute angle.

18. The apparatus in claim 9 wherein the ratio of the speed of said diagonally extending driven means to the speed of first conveyor surface is about the cosine of said first acute angle.

19. The apparatus in claim 12 wherein said recirculating turning means comprises a roller chain recirculating around in an upper pass and a return lower pass around a pair of end sprockets, and means to controllably elevate said upper pass to turn articles, and to lower it to allow articles to pass.

20. The apparatus in claim 19 wherein one of said sprockets is shiftable and biased to maintain constant tension on said roller chain whether the latter is elevated or lowered.

21. A method of rapidly orienting selected ones of a series of cartons on a conveyor path with one carton axis originally parallel to and another carton axis normal to such conveyor path, comprising the steps of: advancing the cartons along the conveyor path and, while so advancing them, turning cartons through an acute angle in one angular direction so that both of said carton axes are diagonal to said conveyor path; and then transferring the cartons onto a second diagonal conveyor path at a second acute angle to said first path in the opposite angular direction, and which second acute angle is complementary to said first mentioned acute angle, so that the turned cartons have their axes parallel to and normal to said second conveyor path only selected ones of said cartons turned through said first mentioned acute angle, and the remaining cartons being turned through the complementary acute angle as they are transferred to said second conveyor path, to also have their axes normal and parallel to said second path but at 90° to the respective axes of the selected cartons.

References Cited

UNITED STATES PATENTS 2,716,497  8/1955  Wahl.

FOREIGN PATENTS 1,028,032  4/1958  Germany.

EDWARD SROKA, Primary Examiner

PO-1050
(5/69)

UNITED STATES PATENT OFFICE
CERTIFICATE OF CORRECTION

Patent No. 3,508,640          Dated April 28, 1970

Inventor(s) Maynard J. DeGood & Clyde L. Bowman

It is certified that error appears in the above-identified patent and that said Letters Patent are hereby corrected as shown below:

| | |
|---|---|
| Column 1, line 18; | after "acute", insert --- angle ---, |
| Column 2, line 42; | delete "cooperatives", insert --- cooperates ---, |
| Column 3, line 65; | after "44", insert --- includes ---, |
| Column 5, line 70; | after "it is" and before "different", insert --- desirable to interlock them by rotating selected cartons into ---, |
| Column 7, line 65; | delete "detector", insert --- detecting ---, |
| Column 10, line 29; | after "cartons" and before "turned", insert --- being ---. |

SIGNED AND
SEALED
SEP 22 1970

(SEAL)
Attest:

Edward M. Fletcher, Jr.
Attesting Officer

WILLIAM E. SCHUYLER, JR.
Commissioner of Patents